(No Model.)

P. E. KIRVEN.
CULTIVATOR.

No. 360,304. Patented Mar. 29, 1887.

WITNESSES
Phil C. Dieterich
A. E. Sowell

INVENTOR
Peter E. Kirven
by: J. A. Alexander
Attorney

UNITED STATES PATENT OFFICE.

PETER E. KIRVEN, OF WORTHAM, TEXAS.

CULTIVATOR.

SPECIFICATION forming part of Letters Patent No. 360,304, dated March 29, 1887.

Application filed October 11, 1886. Serial No. 215,902. (No model.)

*To all whom it may concern:*

Be it known that I, PETER E. KIRVEN, of Wortham, in the county of Freestone and State of Texas, have invented certain new and useful Improvements in Cultivators; and I do hereby declare that the following is a full, clear, and exact description thereof, reference being had to the accompanying drawings, and to the letters of reference marked thereon, which form part of this specification, in which—

Figure 1:
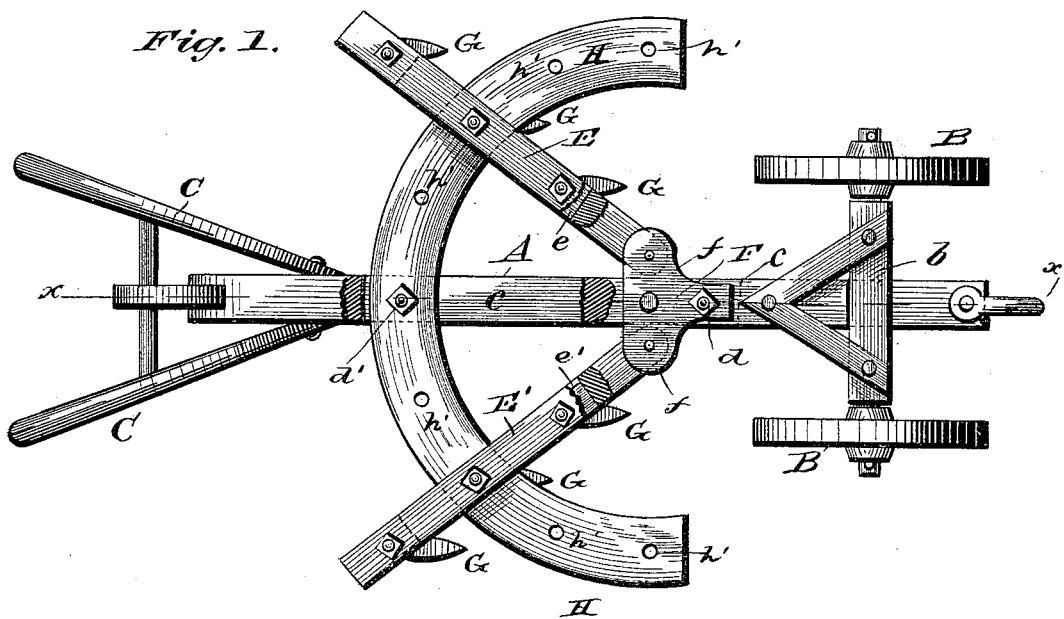
Figure 2:
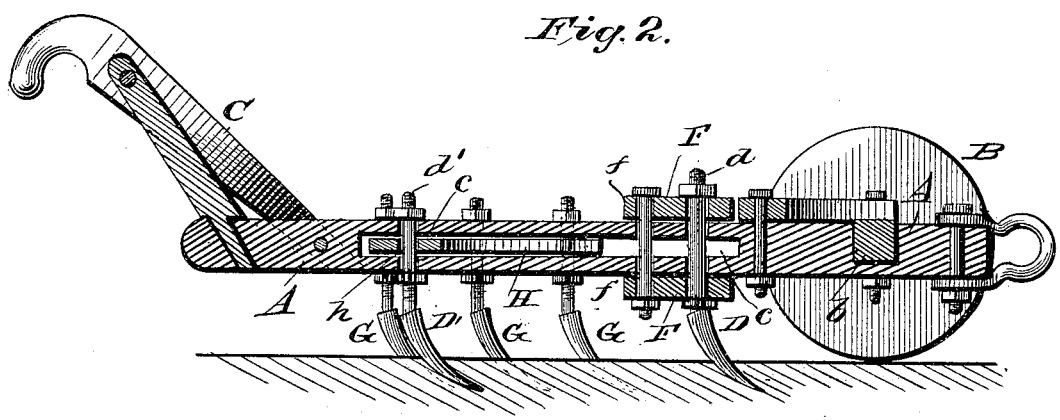
Figure 3:
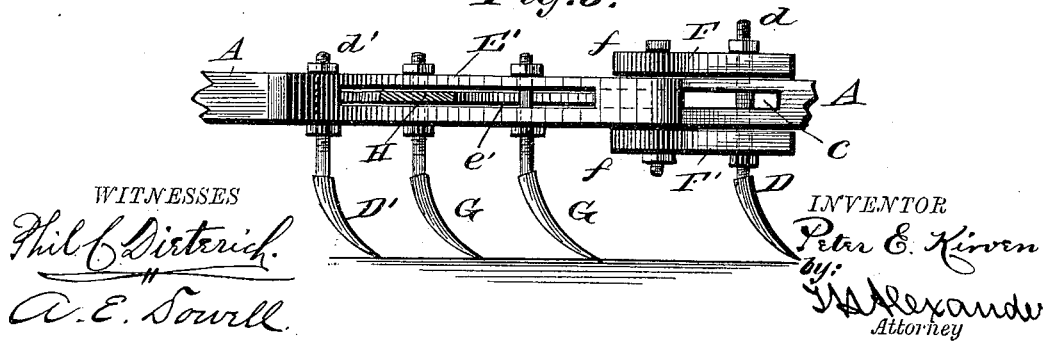

Figure 1 is a plan view, partly in section. Fig. 2 is a vertical longitudinal section on line *x x*, Fig. 1. Fig. 3 is a detail side elevation, partly in section, showing the construction of one of the wings.

This invention relates to improvements in plows and cultivators, the principal object being to render the points or shovels laterally adjustable with relation to each other and the plow-beam and to render the side rows of points or shovels reversible in position on the plow-beam. These objects are secured by means hereinafter described, illustrated in the drawings, and pointed out in the appended claims.

Referring to the drawings, A designates the plow-beam, having secured to it near its front end the axle *b* of the wheels B. The handles C are secured to the plow-beam near the rear end of the same, and are of ordinary construction. The plow-beam is either made of an upper and lower part or bar secured firmly together at their ends, or has the long lateral and longitudinal slot *c* made in it. When of two parts, the slot *c* is between the same.

D D' are similar plow points or shovels, the shanks or standards *d d'* of which pass through suitable openings in the plow-beam near the front and rear ends of the same, respectively. These shanks have nuts above and below the beam on their threaded upper ends, so that they can be adjusted vertically.

E E' are similar arms on each side of the plow-beam, and respectively provided with long longitudinal and lateral slots *e e'*, similar to the slot *c* in the plow-beam. The inner end of each of said arms is pivoted between ears *f f* on the edges of the similar plates F F', one above and the other below the plow-beam, to which they are attached by the threaded upper end of either plow-point D or D'. The plates are thus adjustable from near the front end to near the rear end of the plow-beam.

G G are plow points or shovels similar to the points D D', and secured at equal distances apart on the arms E E' by means of nuts above and below the arms on their threaded upper ends, so as to be vertically adjustable.

H is a semicircular plate provided with a central opening, *h*, and openings *h'* at equal distances apart on each side of the same. The said plate passes through the slot *c* in the plow-beams and through the slots *e e'* in the side opening, and has the shank of either point D D' passing through its central opening, *h*, to hold it to the plow-beam. The upper ends of the shanks of the points or shovels G G are adapted to pass through the openings *h'* on each side of the central opening in the plate H, so as to hold the latter to the side arms. When the plates F F' are attached to the plow-beam at the position of the point or shovel D, the arms will extend rearward and the ends of the semicircular plate will be directed frontward, its center being held by the shank of the point D'. The point or shovel D is then in front of the other shovels, and the arms E E' may, by means of the shanks of the shovels G and the openings *h'* in the plate H, be extended outward at any angle desired, with their outer ends directed rearward. Thus the machine is adjustable to suit the width of the rows. To plow between rows, the plates F F' are attached to the plow-beam at the position of the point or shovel D', and the center of the plate H secured to the beam at the position of the point or shovel D. This reverses the positions of the arms E E' and plate H and the plow-beam, the ends of the former being directed frontward and those of the plate rearward.

In cultivating small grain the arms are set at about right angles to each other and at angles of about forty-five degrees with the plow-beam, the semicircular plate H being moved sufficiently to one side to permit doing so.

The plow-points are preferably made detachable from their shanks, and are of any desired style or pattern.

Having described my invention, what I claim, and desire to secure by Letters Patent, is—

1. The combination of the plow-beam slotted longitudinally from side to side, the semicircular plate passing through the slot in the plow-beam and capable of having its position reversed on the latter, and the longitudinally-slotted arms connected to the plow-beam, so as to swing outward thereon, having the shanks of the plow points or shovels attached to them, and with the ends of the semicircular plate passing through their slots, in order to be angularly adjusted thereon, substantially as specified.

2. The combination of the slotted plow-beam, the device composed of an upper and lower plate, sliding on the plow-beam and capable of being secured at different positions thereon, the slotted arms having plow points or shovels attached and with their inner ends pivoted between the upper and lower ends of the sliding device, and the semicircular adjusting-plate, all constructed and arranged substantially as shown and described.

3. The combination of a plow-beam having the slot $c$, the device composed of the plates F F', the arms E E', respectively provided with the slots $e$ $e'$, the semicircular plate H, provided with the openings $h$ $h'$, and the plow-points D D' G, having the ends of their shanks or standards threaded and engaging suitable retaining and adjusting nuts, all constructed and arranged substantially as shown and described, for the purpose specified.

In testimony that I claim the foregoing as my own I affix my signature in presence of two witnesses.

P. E. KIRVEN.

Witnesses:
J. D. SINGLETON,
J. LEONARD.